UNITED STATES PATENT OFFICE.

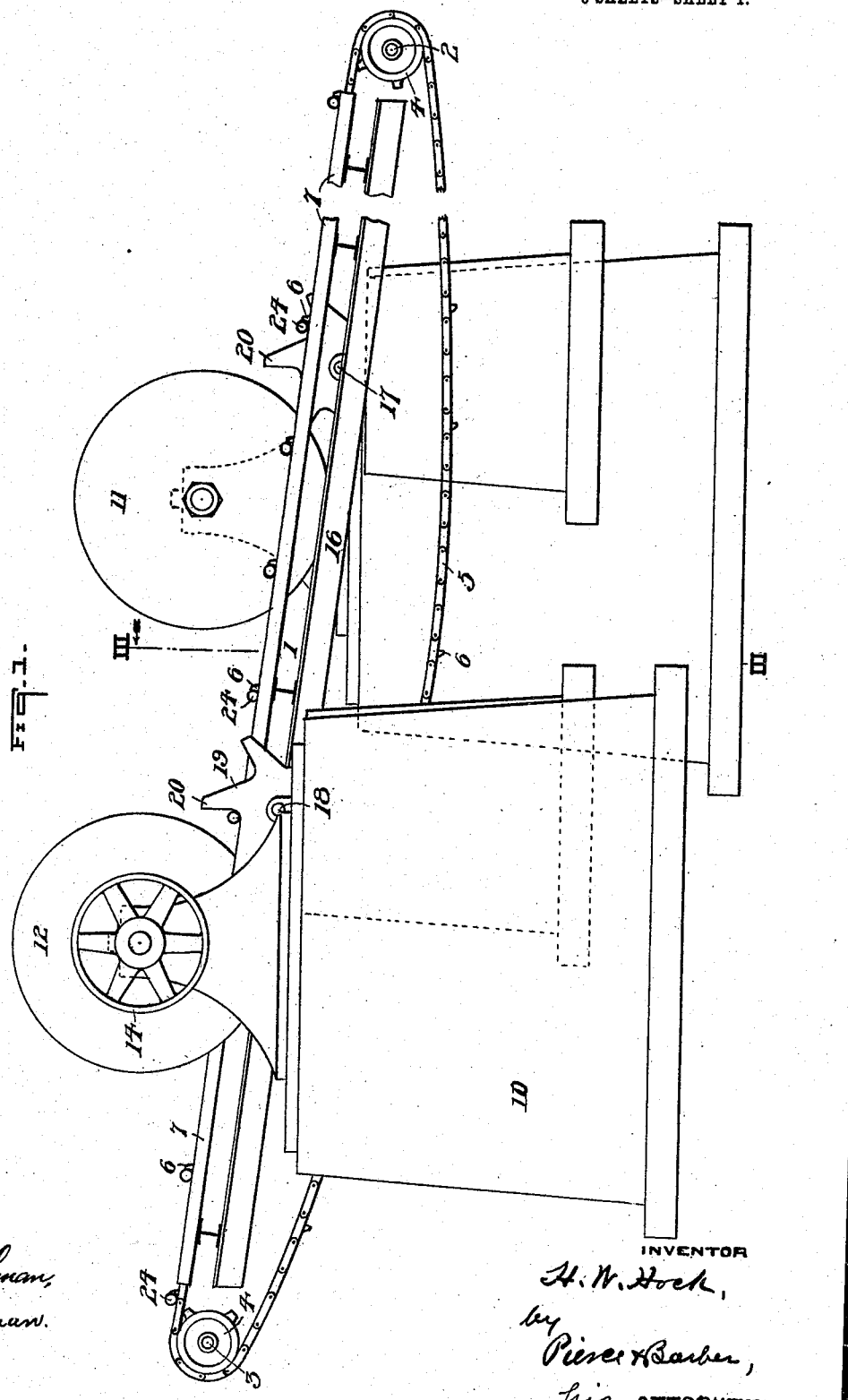

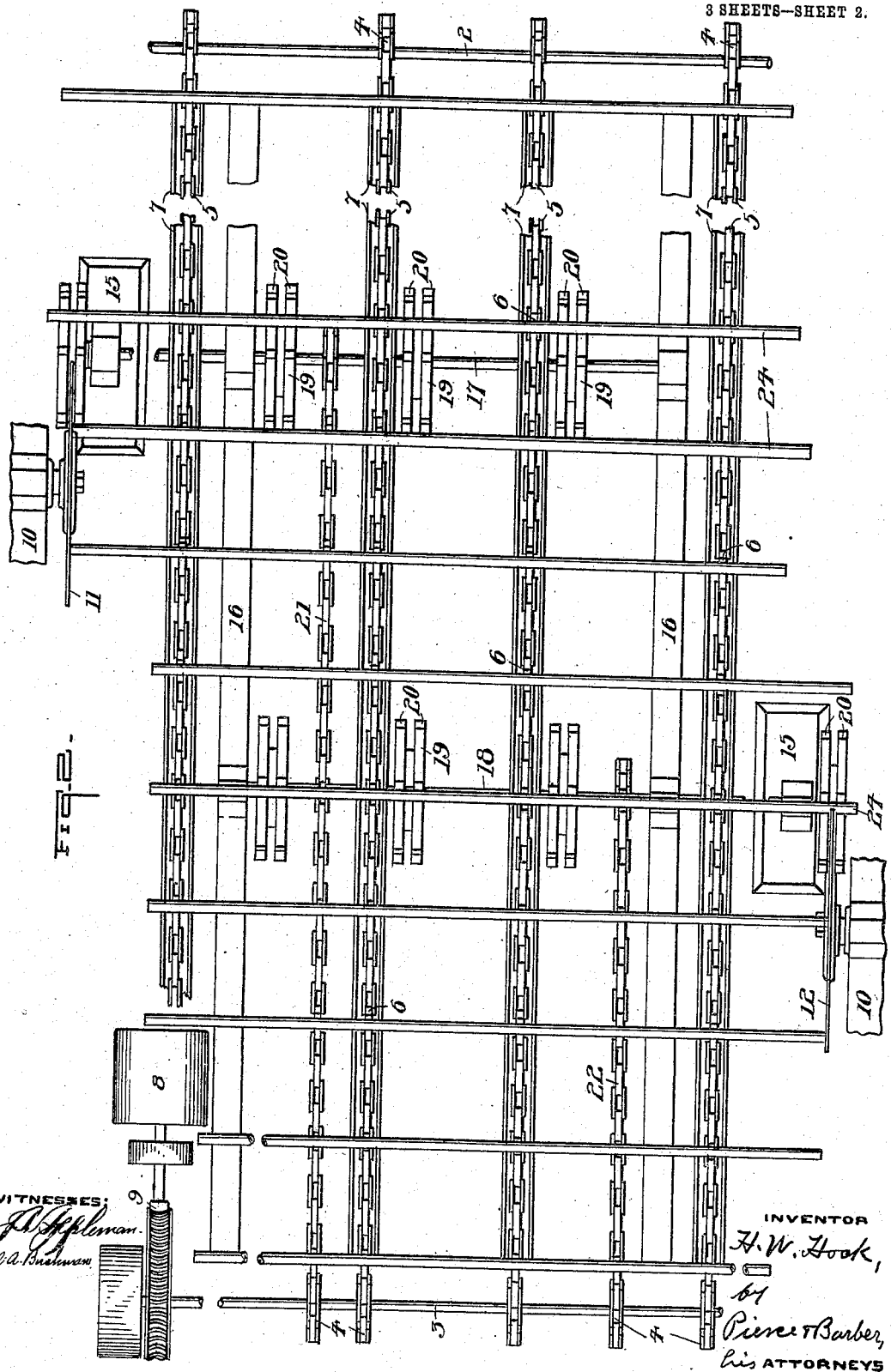

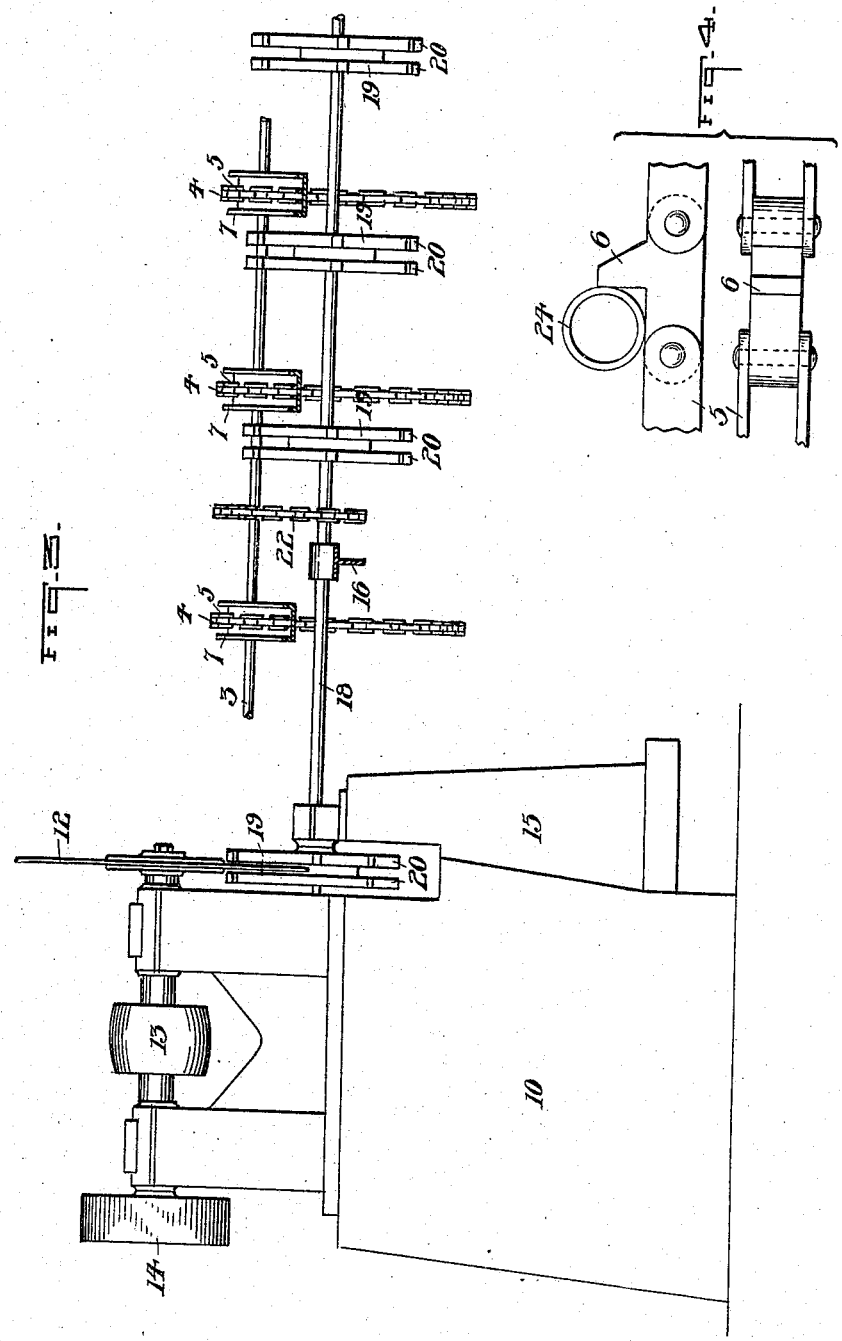

HENRY W. HOCK, OF YOUNGSTOWN, OHIO, ASSIGNOR TO YOUNGSTOWN SHEET AND TUBE COMPANY, OF YOUNGSTOWN, OHIO, A CORPORATION OF OHIO.

COOLING-BED.

936,897.

Specification of Letters Patent. Patented Oct. 12, 1909.

Application filed September 26, 1905. Serial No. 280,173.

*To all whom it may concern:*

Be it known that I, HENRY W. HOCK, a citizen of the United States, residing at Youngstown, in the county of Mahoning and State of Ohio, have invented or discovered new and useful Improvements in Cooling-Beds, of which the following is a specification.

My invention relates generally to improvements in cooling-beds for pipe or similar mills, but more especially to the equipping of such a bed with means for sawing or cutting off the imperfect or crop ends of the tubes or the like.

In the manufacture of tubes from skelp, the tubes, as they leave the welding bells or rolls, are more or less bent and imperfectly welded for a greater or less distance from both ends. It has been the practice hitherto to pass the tubes from the cooling bed to a conveyer which takes them to the vicinity of a cutting-off machine, to which they are presented by hand. This is not only slow, but requires extra floor space and more handling of the tubes.

By my invention, the tubes are sawed off at both ends while still hot and traveling on the cooling bed, which can be accomplished without any extra time being consumed or any extra laborers being employed for the purpose.

I accomplish my objects preferably by the mechanism shown on the accompanying sheets of drawings, in which—

Figure 1 is a side elevation; Fig. 2, a plan; Fig. 3, an end elevation; and Fig. 4, a fragmentary elevation and plan of the conveyer chain for the cooling bed.

Referring now to the drawings for a more detailed description of my invention, 1 designates as a whole the frame-work of the inclined cooling-bed, which frame-work may be constructed in the usual or any approved manner. At the ends of the frame are the parallel shafts 2 and 3, carrying the sprocket-wheels 4, over which run the sprocket-chains 5, having thereon at proper intervals lugs 6 which carry the pipes, as they come from the cross-rolls (not shown) up the inclined bed and discharge them at the upper end in the usual manner. Preferably the chains travel in the metal troughs 7 and with the lugs only above the edges thereof. One of the shafts, as 3, is driven by the motor 8 and the worm gearing 9. Supported on the foundations 10 at the sides of the cooling-bed are the metal saws 11 and 12, one in advance of the other as shown on Figs. 1 and 2.

13 and 14 represent respectively the driving pulley and the fly-wheel of the saw 12.

Journaled on the foundations 15 at the sides of the bed-frame and on the longitudinal bars 16 thereof are the two shafts 17 and 18 below the saws 11 and 12 respectively. The shafts 17 and 18 have fixed to them at convenient intervals the finger or feed disks 19, which are shown secured together in pairs spaced slightly apart. The shafts 17 and 18 are so located below the chains 5 that the fingers 20 on the said shafts project above the chains and push the pipes against the saws, which run between the fingers of the pair of disks 19 adjacent to the respective saws. The fingers and disks may be variously constructed, and the shaft located in any position relative to the saws provided they carry the tubes against the saws in a positive and steady manner. The shafts 17 and 18 are driven by the sprocket chains 21 and 22 respectively running over sprocket wheels on said shafts and the shaft 3.

24 designates the pipes on the cooling-bed.

The operation is as follows: The pipes 24 are carried over the cooling-bed by means of the lugs 6 which in the several chains 5 are arranged in rows transversely of the bed 1. As shown the pipes will first be moved to the right on Fig. 2 a sufficient distance to enable the saw 11 to cut off the imperfections at that end of the pipes. Just before the pipes reach the saw 11, the fingers 20 which are also arranged in rows transverse of the bed move up in the rear of the pipes and steady them, as they are sawed off. It will be noted that the fingers 20 are preferably inclined in the direction of their rotation so that they act to push the pipes against their bottom supports, which are shown as the troughs 7, with more force than if the fingers were perfectly radial. When the saw strikes the tubes they are confined on all sides by the troughs 7, the fingers 20, and the saw, and are held much more steady than by the lugs 6 alone, which preferably feed the pipes as well during the sawing operation as at other times. After the pipes have passed the saw 11, they are slid to the left and presented to the saw 12 which cuts off the defective portion at the remaining ends thereof, in the same manner as the first end was cut off.

Having described my invention, I claim—

1. The combination of a cooling bed having a continuously moving carrier for metallic pipes and the like, a saw for severing the ends of said articles, and a rotary device having fingers arranged to engage and steady the articles as they are presented to the saw.

2. In an apparatus for welding and cutting off the welded pipe while hot, the combination of a welding apparatus, a rack arranged to receive the pipe while hot from the welding apparatus and having a series of continuously traveling fingers in line with each other adapted to engage the pipe body at different points in its length and carry the pipe in lateral course, a saw located in the course of the hot pipe when carried on the rack and means for holding the pipe down upon the rack during the sawing thereof.

3. In an apparatus for welding and cutting off the welded pipe while hot, the combination of a welding apparatus, a rack arranged to receive the pipe while hot from the welding apparatus and having a series of continuously traveling fingers in line with each other adapted to engage the pipe body at different points in its length and carry the pipe in lateral course, a saw on each side of the rack located in the course of the hot pipe when carried on the rack and means for holding the pipe down upon the rack during the sawing thereof.

4. In an apparatus for welding and cutting off the welded pipe while hot, the combination of a welding apparatus, a rack arranged to receive the pipe while hot from the welding apparatus and having a series of continuously traveling fingers in line with each other adapted to engage the pipe body at different points in its length and carry the pipe in lateral course, two saws located in the course of the pipe when carried by the rack, one saw being set in advance of the other and means for holding the pipe down upon the rack during the sawing thereof.

Signed at Youngstown, Ohio, this 21st day of September, 1905.

HENRY W. HOCK.

Witnesses:
P. J. SCANLON,
CHAS. M. TRASK.